United States Patent Office 3,449,164
Patented June 10, 1969

3,449,164
CHEMICAL COMPOSITION AND METHOD FOR THE REMOVAL OF BEER STONE
Attila Vinkler and Janos Cserhati, Budapest, Hungary, assignors to Nikex Nehezipari Kulkereskedelmi Vallalat, Budapest, Hungary
No Drawing. Filed Oct. 26, 1966, Ser. No. 589,519
Int. Cl. C23g 1/04; B08b 3/08
U.S. Cl. 134—3    10 Claims

ABSTRACT OF THE DISCLOSURE

Beer stone is a tenacious, hard to remove deposit which is formed on the surface of brewery equipment. This invention provides a relatively high pH acidic composition having as its principal ingredients at least 63% ammonium bisulfate and 0.5–4% of an alkyl-aryl- or alkyl sulfonic acid, such as toluene sulfonic acid. Depending on the nature of the beer stone deposit to be removed, optionally up to 50% of the ammonium bisulfate can be substituted with ammonium sulfate, or up to 10% of the ammonium bisulfate can be substituted with sulfuric acid. The composition can also optionally contain 0.5–2% of an alkali chromate, alkali dichromate, or both.

---

The present invention relates to a chemical composition and method for the removal of beer stone, more particularly to the removal of beer stone from the surface of brewery equipment.

The walls and surfaces of brewery equipment, such as of fermenting vessels, storage containers and the like, tend to become encrusted with a hard, tenacious, firmly adhering, tough solid deposit, commonly termed beer stone. Equipment of this type is usually made from aluminum, enameled iron or steel, coated steel-reinforced concrete, and the like. Beer stone is a composite and contains mostly calcium oxalate, calcium phosphate, calcium sulfate, proteins precipitated by tannic acid and hard resin (hop resin). This stone is very hard to remove by decomposing it with chemical or physical methods. Mechanical removal is also very difficult and time consuming. When removal by mechanical means is employed, the equipment being cleaned is subjected to considerable mechanical stress, and is often damaged. In steel-reinforced concrete tanks with a lining, such as of a wax and pitch paste, the lining is particularly likely to be damaged when mechanical methods are employed. Regular, periodic removal of beer stone is of great importance, since if not removed, it forms a porous incrustation of uneven surface, which is a ready host for the settling and propagation of microorganisms which can detrimentally affect the quality of the beer and harmfully affect the consumer. Brewery equipment cannot be kept biologically clean, unless the beer stone is removed.

In view of the difficulty and the risks involved in the mechanical removal of beer stone, it has been proposed to use a 20 to 25% nitric acid solution for decomposing the beer stone encrusted upon the surface of equipment made of a material inert to nitric acid, such as aluminum. On the other hand, nitric acid generates caustic gases harmful to operating personnel who, therefore have to wear inconvenient protective clothing. It has also been proposed to use a 40 to 50% sulfuric acid solution which, while it does not develop gases, can cause serious injuries to operating personnel and can also damage clothing and equipment. Due to the harmful effects of such corrosive chemicals, their use did not gain ready acceptance as a full substitute for the lengthy and work-consuming procedure involved in the mechanical removal of beer stone.

It is an object of the present invention to provide a composition and a method for the removal of beer stone which overcome the drawbacks of conventional materials and methods employed for this purpose, and which composition and method will decompose without any difficulty, even the most persistently adhering deposits of beer stone.

The beer stone removing composition of the present invention comprises a room temperature-supersaturated aqueous solution of (a) an ammonium bisulfate component which comprises: (1) at least 63% by weight, based on the composition, of ammonium bisulfate; or (2) a mixture of ammonium bisulfate and ammonium sulfate, wherein up to 50% by weight, based on the mixture, of the amount of ammonium bisulfate specified under (1) above is substituted with the ammonium sulfate; or (3) a mixture of ammonium bisulfate and sulfuric acid, wherein up to 10% by weight, based on the mixture, of the amount of ammonium bisulfate specified under (1) above is substituted with the sulfuric acid; and (b) 0.5–4% by weight, based on the composition, of an alkyl-aryl- or aryl sulfonic acid.

The pH of the solution of the present invention, even when sulfuric acid is used, is considerably higher than that of aqueous solutions of the conventionally used strong acids. Ammonium bisulfate which also acts as a buffer maintains the pH of the solution at such higher level even when sulfuric acid is present. The solution which is accordingly less acidic has hardly any caustic effect on the human skin, it can be removed by simple rinsing with water and has no permanently harmful effect.

Inorganic components of the beer stone such as calcium sulfate are dissolved by the saturated aqueous ammonium bisulfate solution due to double- or complex-salt formation. The alkyl-aryl- or alkyl sulfonic acid component of the solution causes a swelling and peptizing of the organic substances in the beer stone. These organic substances are the principal contributors which cause the remarkable toughness and hardness of beer stone. The sulfonic acid also dissolves the calcium salts in the beer stone.

When the composition of the present invention is used for freeing aluminum surfaces from beer stone, it is preferred to add 0.5–2% by weight, based on the composition, of an alkali chromate or an alkali dichromate to act as an inhibitor preventing dissolution of the aluminum.

It is an essential feature of the composition of the present invention that the solution is supersaturated in ammonium bisulfate at room temperature. Complete solution of the ammonium bisulfate can be achieved in most cases only above 60° C. At lower temperatures, a part of this compound precipitates from the solution in the form of fine crystals. These settle as a sludge, but can be stirred up to form a dilute slurry.

The composition of the present invention can be prepared by mixing a saturated, warm aqueous solution of ammonium bisulfate with a like solution of the alkyl-aryl- or alkyl sulfonic acid, preferably of toluene sulfonic acid. Preferably sulfuric acid is then added, which increases the activity of the composition. The alkali chromate or alkali dichromate can then be added to the optionally sulfuric acid-containing solution. During cooling of the mixture the ammonium bisulfate precipitates in the form of fine crystals.

The ingredients of the composition of the present invention are readily available. Ammonium bisulfate can also be prepared in situ by mixing a solution of ammonium sulfate with sulfuric acid in equal stoichiometric proportions.

A preferred embodiment of the composition of the invention contains 87.5% by weight ammonium bisulfate and 1.5% by weight toluene sulfonic acid with the balance being water. A composition such as this one, at room temperature contains finely suspended ammonium bisulfate crystals in the saturated aqueous solution of the ammonium bisulfate. Upon heating the crystals gradually dissolve, and at 60 to 65° C. the suspension becomes a true solution which is free of crystals.

The aforementioned illustrative composition can be varied, such as by increasing or decreasing the degree of supersaturation, depending on the thickness of the beer stone incrustation to be removed.

The following composition is exemplary of the type of solution useful for the preventive maintenance of brewery equipment subject to beer stone formation. This solution contains 64.5% by weight ammonium bisulfate, 1.0% by weight toluene sulfonic acid, with the balance being water. At 20° C. this mixture contains 10% by weight ammonium bisulfate crystals in suspended state. The crystals in this solution are completely dissolved in the saturated solution at 30° C.

The concentration of the alkyl-aryl- or alkyl sulfonic acid can be varied in the range between 0.5 and 4.0% by weight, depending on the composition of the beer stone deposit, as well as on economic considerations.

If the material of the surface to be treated is sensitive to the effect of an acidic salt of sulfuric acid, one can reduce the likelihood of corrosion by increasing the pH of the solution. The aggressivity of the solution can be reduced by substitution of an equal amount of ammonium sulfate for up to 50% of the ammonium bisulfate. On the other hand, in cases where a lower pH, i.e., higher acidity will not impair the material of the surface, a small amount of not more than 18% by weight of the ammonium bisulfate can be substituted with sulfuric acid. Such addition of acid is particularly preferred when an acceleration of the conversion of the calcium salts in the beer stone into a sulfate, and the attendant reduction of the supersaturation in ammonium bisulfate are desired.

The process of the present invention comprises coating the surface with the composition of the present invention while the composition is supersaturated at room temperature, or while the composition is less than supersaturated at an elevated temperature, maintaining the composition in contact with the surface until the beer stone incrustation is sufficiently decomposed, and removing the sufficiently decomposed beer stone incrustation from the surface. Removal of the decomposed beer stone can most conveniently be carried out by rinsing, brushing, or both.

Whether a cold, supersaturated solution or a warmer, less supersaturated solution is used, will depend both on the particular composition to be used and the particular result intended to be accomplished.

Application of the cold solution can be carried out by thoroughly stirring the sludge of fine ammonium bisulfate crystals then applying the near room temperature or colder suspension onto the surface to be treated, such as with a brush. Application of the warm solution is carried out by first heating the solution, preferably immediately before use, until the suspended crystals are entirely dissolved. This occurs, depending on the concentration, in most cases above 60° C. The solution so obtained is applied, conveniently by a spraying gun, onto the surface to be cleaned. The warm solution starts to cool as soon as it contacts the cold surface to be treated, and the crystals will reprecipitate.

The compositon of the present invention can also be applied onto the surface to be treated in any other known manner. The above-mentioned, preferred methods of applying the composition according to the invention considerably increase its surprising effectiveness, because the crystal web phase thus formed on the surface of the beer stone retains and stores a large amount of the effective ingredients of the solution for the purpose of the dissolution reaction of the compounds forming the beer stone. A further important role of the crystals is that due to their gradual dissolution, they constantly replenish the effective ingredients consumed in the course of their reaction with the beer stone; hence, the constant saturation in ammonium bisulfate required for efficiently dissolving calcium sulfate is insured for as long as is necessary for complete decomposition of the beer stone.

It is preferred to avoid the use of inert thickening agents, such as starch or talcum, because these tend to plug the fine pores of the beer stone incrustation, thereby hindering and delaying its decomposition. Only with the crystalline form of the effective ingredient can the beneficial effects of the process of this invention be realized.

After having applied the preparation either hot or cold, it will continue to decompose the beer stone for several hours at ambient temperature. The length of this period primarily depends on the thickness of the incrustation to be removed, from its compactness, and from the nature of its components. Even if the deposit is very thick, its decomposition and removal does not require over removal does not require over 24–36 hours. The incrustation can be tested after some time lapsed since the application of the solution, such as by scraping it to determine whether it has sufficiently loosened, and if so, the beer stone can be removed by application of a powerful jet of water and/or a soft brush. The metal or other surface then appears in its original state, free from any beer stone deposit, and even the most sensitive surfaces, such as those covered by coatings sensitive to mechanical interference, regain their original smoothness and gloss.

The composition according to the invention can be conveniently used for preventive maintenance at frequent intervals when the incrustation is still very light. For this purpose a more dilute mixture is sufficient, such as one which is saturated already at 25 to 30° C. These solutions can accomplish their purpose after a period of 1–2 hours on the surface to be cleaned and can then be rinsed off. The film-life deposit of beer stone which accumulated on the surface since it was last cleaned, is thus removed, and the equipment can be maintained continuously clean, with frequent and regular treatments.

The concentration of the ammonium bisulfate component can be varied depending on the thickness of the beer stone deposit to be removed. If the beer stone incrustation is thicker, higher concentrations of the ammonium bisulfate component are preferred. This increase in concentration will result in a solution which becomes saturated at a higher temperature, and contains a larger amount of crystalline sludge as a reserve of the effective agent. If a larger quantity of crystals is present, also more liquid is retained for dissolving the beer stone. It is a special feature of the present invention that by its employment, even equipment made of such material as aluminum, which is most conducive to beer stone formation and which is also difficult to clean my mechanical methods, can be kept clean, whereby the turnover of transport containers can be increased and equipment shutdown can be minimized.

We claim:
1. A beer stone removing composition, comprising a room temperature-supersaturated aqueous solution of:
(a) an ammonium bisulfate component which comprises
(1) at least 63% by weight, based on the composition, of ammonium bisulfate; or
(2) a mixture of ammonium bisulfate and ammonium sulfate, wherein up to 50% by weight, based on the mixture, of the amount of ammonium bisulfate specified under (1) above is substituted with the ammonium sulfate; or
(3) a mixture of ammonium bisulfate and sulfuric acid, wherein up to 10% by weight, based on the mixture, of the amount of ammonium bisulfate specified under (1) above is substituted with the sulfuric acid; and
(b) 0.5–4% by weight, based on the composition, of an alkyl-aryl- or aryl sulfonic acid.

2. The beer stone removing composition of claim 1, further comprising 0.5–2% by weight, based on the composition, of alkali chromate, alkali dichromate, or both.

3. The beer stone removing composition of claim 1, wherein said alkyl-aryl sulfonic acid is toluene sulfonic acid.

4. The beer stone removing composition of claim 2, wherein said alkyl-aryl sulfonic acid is toluene sulfonic acid.

5. The beer stone removing composition of claim 1, comprising 80–89% by weight of the ammonium bisulfate component, and 0.5–1.5% by weight toluene sulfonic acid.

6. The beer stone removing composition of claim 5, further comprising 0.5–2% by weight of alkali chromate, alkali dichromate, or both.

7. The beer stone removing composition of claim 1, comprising 64–80% by weight of the ammonium bisulfate component, and 0.5–1.5% by weight toluene sulfonic acid.

8. The beer stone removing composition of claim 7, further comprising 0.5–2% by weight of alkali, chromate, alkali dichromate, or both.

9. A method for removing beer stone incrustations from a surface, comprising the steps of coating the surface with the composition of claim 1 while the composition is supersaturated at room temperature, or while the composition is less than supersaturated at an elevated temperature, maintaining the composition in contact with the surface until the beer stone incrustation is sufficiently decomposed, and removing the sufficiently decomposed beer stone incrustation from the surface.

10. The method of claim 9, wherein said step of removing comprises the rinsing off or brushing off the sufficiently decomposed beer stone incrustations from the surface.

References Cited

UNITED STATES PATENTS

| | | | |
|---|---|---|---|
| 2,700,004 | 1/1955 | Miller | 134—13 |
| 2,694,657 | 11/1954 | Brundin | 134—13 |
| 3,114,657 | 12/1963 | Stilwell | 134—3 |

OTHER REFERENCES

Hind: Brewing, Science and Practice, 4th ed., 1950, pp. 767–768.

MORRIS O. WOLK, *Primary Examiner.*

M. D. BURNS, *Assistant Examiner.*

U.S. Cl. X.R.

99—275; 134—41; 252—100, 146

UNITED STATES PATENT OFFICE
CERTIFICATE OF CORRECTION

Patent No. 3,449,164                 June 10, 1969

Attila Vinkler et al.

It is certified that error appears in the above identified patent and that said Letters Patent are hereby corrected as shown below:

In the heading of column 1 insert after the filing date and the Serial Number, the following two new lines Claims priority, application Hungary October 30, 1965
        VI-488

Signed and sealed this 21st day of October 1969.

(SEAL)
Attest:

Edward M. Fletcher, Jr.            WILLIAM E. SCHUYLER, JR.
Attesting Officer                      Commissioner of Patents